United States Patent [19]
Chen

[11] Patent Number: 5,988,832
[45] Date of Patent: Nov. 23, 1999

[54] NON-BUTTON LASER POINTER

[75] Inventor: Kuo-Ti Chen, Pin-Chen, Taiwan

[73] Assignee: Quarton Inc., Taipei, Taiwan

[21] Appl. No.: 09/104,187

[22] Filed: Jun. 25, 1998

[51] Int. Cl.⁶ .................................................. F21M 5/02
[52] U.S. Cl. ........................................ 362/259; 362/118
[58] Field of Search .................................. 362/109, 259, 362/118, 205

[56] References Cited

U.S. PATENT DOCUMENTS

| | | | |
|---|---|---|---|
| 2,607,883 | 8/1952 | Berkowitz | 362/118 |
| 4,518,274 | 5/1985 | Hanggi | 362/118 X |
| 4,563,728 | 1/1986 | Bruggeman et al. | 362/118 X |
| 5,343,376 | 8/1994 | Huang | 362/259 |
| 5,473,464 | 12/1995 | Knowles et al. | 362/237 |
| 5,791,766 | 8/1998 | Lee | 362/259 |

*Primary Examiner*—Laura K. Tso
*Attorney, Agent, or Firm*—Rosenberg, Klein & Bilker

[57] ABSTRACT

A laser pointer having a laser generating loop formed of a metal barrel, a metal clip, a metal rear end cap, a series of battery cells, a laser generating unit and a signal line, and controlled by an electronic switch to emit a laser beam, the electronic switch being switched on when the user holds the metal rear end cap in hand and touching the metal clip with one finger, the electronic switch being switched off when the finger is removed from the metal clip.

12 Claims, 7 Drawing Sheets

NON-BUTTON LASER POINTER

FIELD OF THE INVENTION

The present invention relates to a laser pointer, and more particularly to such a non-button laser pointer which uses an electronic switch for operation control instead of a mechanical press button.

BACKGROUND OF THE INVENTION

A variety of laser pointers have been developed for pointing things out of a map, blackboard, etc., and have appeared on the market. FIG. 1 shows a pen-base laser pointer according to the prior art, which a combination of a laser generating apparatus and a pen. This structure of pen-base laser pointer comprises a pen 17 having an outer thread 175 at the rear end, a barrel 10 having an inner thread 151 at the front end threaded onto the outer thread 175 on the pen 17 and a radial through hole 155 at a suitable location, a clip 153 fixedly mounted on the rear barrel 10 for fastening, a laser generating unit 160 mounted inside the rear barrel 10, battery cells 170 mounted inside the rear barrel 10 and connected in series to the laser generating unit 160, and a press button 156 mounted in the radial through hole 155 and disposed above an on/off switch on the circuit board 163 of the laser generating unit 160. This structure of pen-base laser pointer is still not satisfactory in function. The drawbacks of this structure of pen-base laser pointer are outlined hereinafter.

1. The processing of the radial through hole 155 on the rear barrel 10 complicates the fabrication procedure of the pen-base laser pointer.

2. Frequently operating the press button 156 tends to damage the circuit board 163 of the laser generating unit 10.

3. Because the press button 156 protrudes from the outside wall of the rear barrel 10, the sense of beauty of the rear barrel 10 is destroyed.

SUMMARY OF THE INVENTION

The present invention has been accomplished under the circumstances in view. It is one object of the present invention to provide a non-button laser pointer which uses an electronic switch for operation control instead of a mechanical press button. It is another object of the present invention to provide a non-button laser pointer which uses an electronic switch for operation control so that the circuit board of the laser generating unit receives little pressure when the laser pointer is operated. It is still another object of the present invention to provide a laser pointer which eliminates the installation of a press button for operation control, so that the outside wall of the laser pointer is maintained smooth. According to the present invention, the laser generating loop of the laser generating unit is formed of a metal barrel, a metal clip, a metal rear end cap, a series of battery cells, a laser generating unit and a signal line, and controlled by an electronic switch to emit a laser beam. The electronic switch is switched on when the user holds the metal rear end cap in hand and touching the metal clip with one finger. The electronic switch is switched off when the finger is removed from the metal clip.

DETAILED DESCRIPTION OF THE PREFERRED EMBODIMENT

Figure 1:
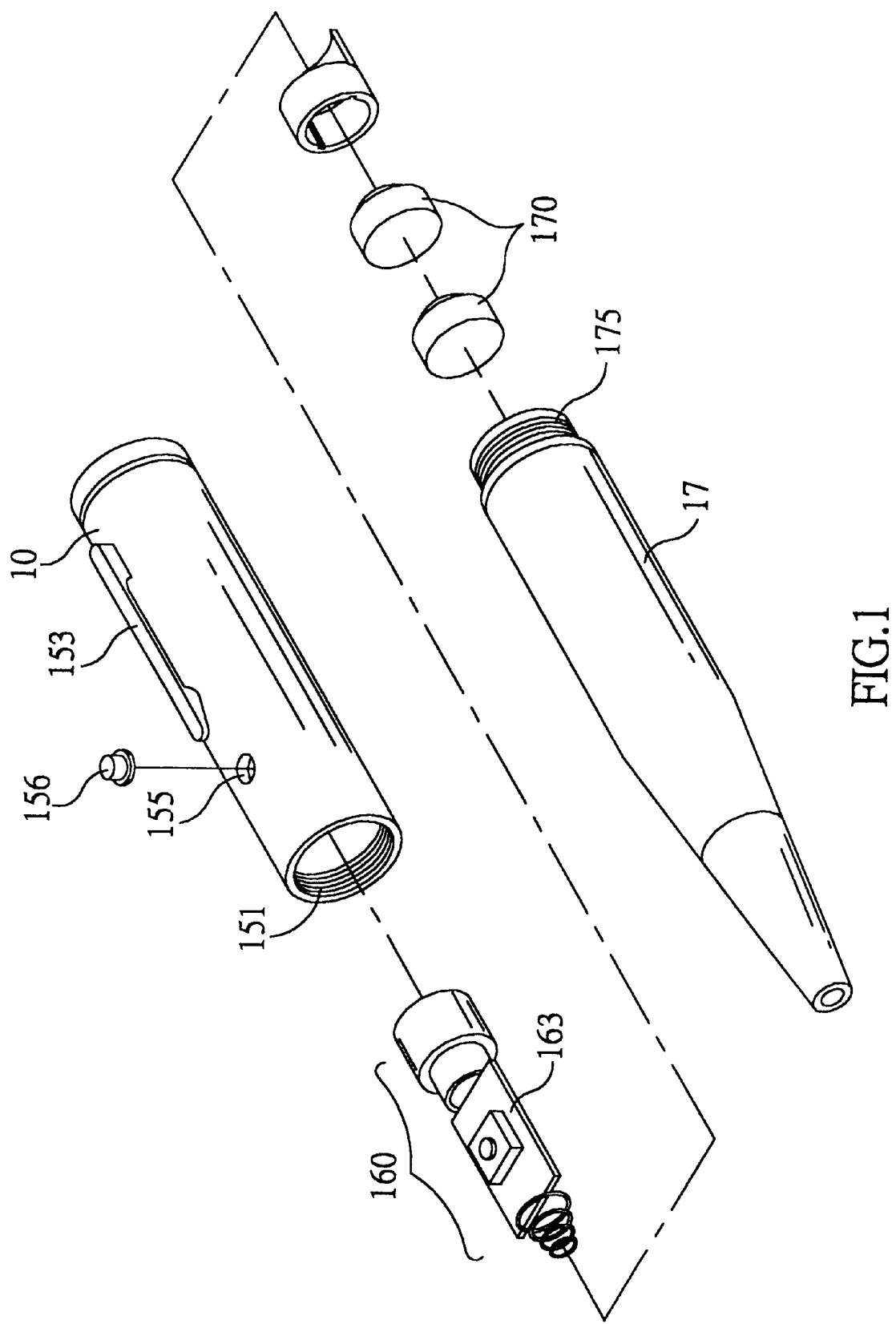
FIG. 1 is an exploded view of a pen-base laser pointer according to the prior art.
Figure 2:
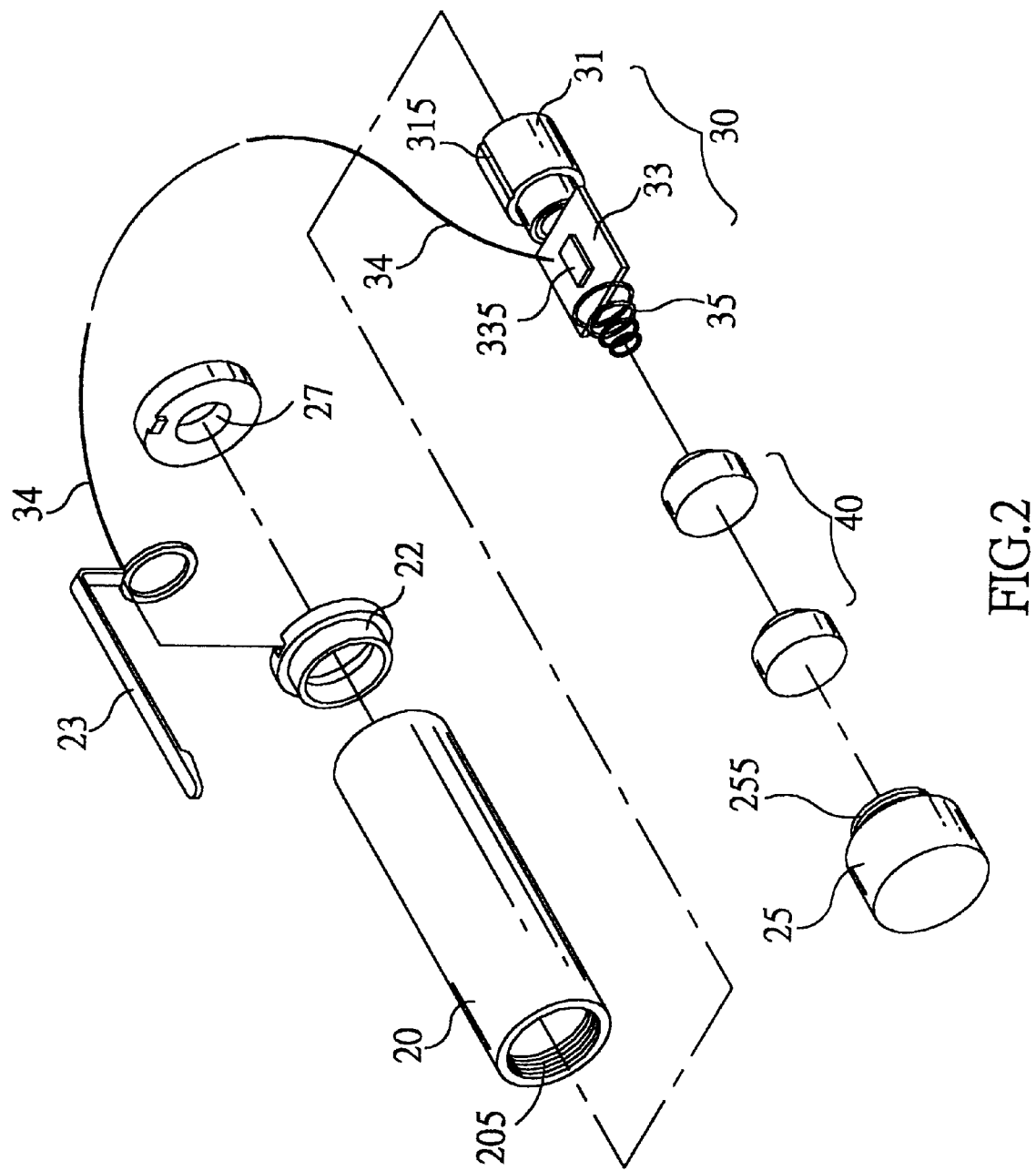
FIG. 2 is an exploded view of a non-button laser pointer according to the present invention.

Referring to FIG. 2, a laser pointer in accordance with the present invention is generally comprised of a barrel 20, a rear end cap 25, a laser generating unit 30, battery cells 40, an annular clip holder 22, a clip 23, a signal line 34, and an annular laser firing cap 27.

Figure 3:
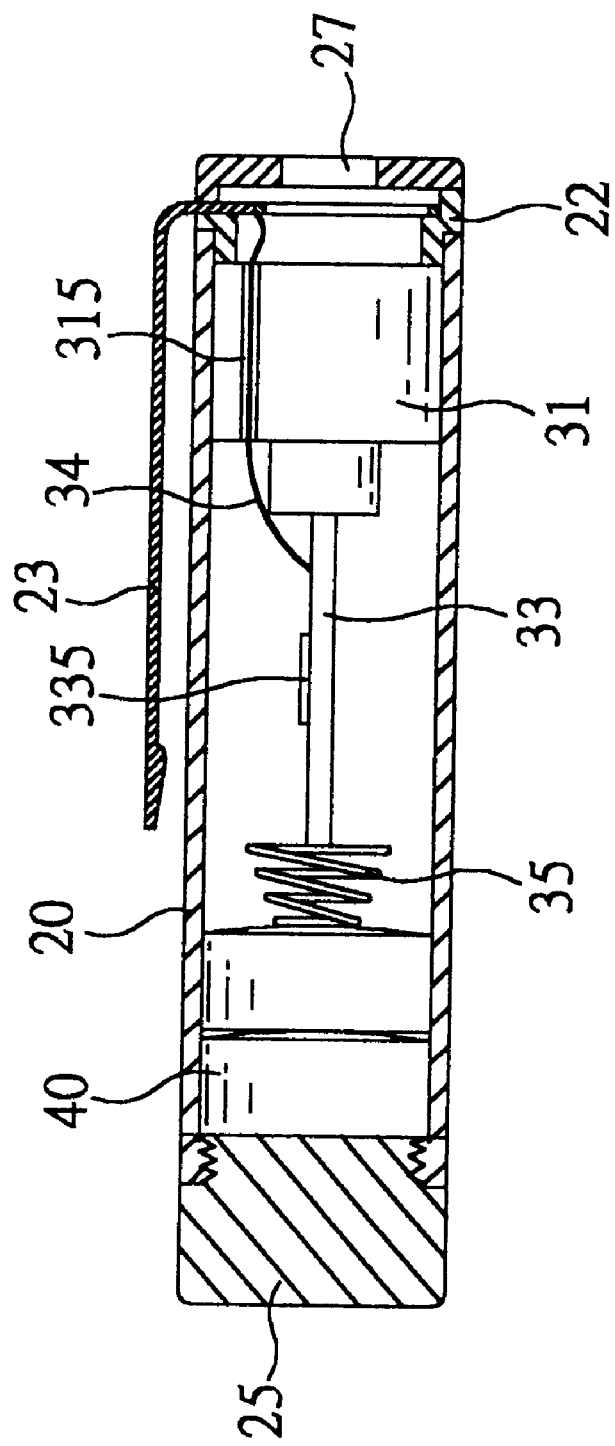
FIG. 3 is a sectional assembly view of the non-button laser pointer according to the present invention.

Referring to FIG. 3 and FIG. 2 again, the barrel 20 is made from metal, having an inner thread 205 at one end, namely, the rear end. The annular laser firing cap 27 is fixedly fastened to one end, namely, the front end of the barrel 20 is remote from the inner thread 205. The rear end cap 25 is made from metal, having an outer thread 255 threaded into the inner thread 205 on the barrel 20 to close its rear end. The laser generating unit 30 is comprised of a laser diode 31, a circuit board 33, and a spiral metal spring 35. The circuit board 33 comprises an electronic switch 335. The battery cells 40 are mounted inside the barrel 20, and connected in series between the metal rear end cap 25 and the spiral metal spring 35. The spiral metal spring 35 is connected between one end of the series of battery cells 40 and one end of the electronic switch 335 on the circuit board 33. The annular clip holder 22 is electrically insulated, and retained between the metal barrel 20 and the annular laser firing cap 27 to hold the clip 23 outside the metal barrel 20. The clip 23 is made from metal. The signal line 34 is connected between the metal clip 23 and the other end of the electronic switch 335 on the circuit board 33. Further, the laser diode 31 has a wire groove 315 on the outside wall of the shell thereof for receiving the signal line 34.

Figure 4:
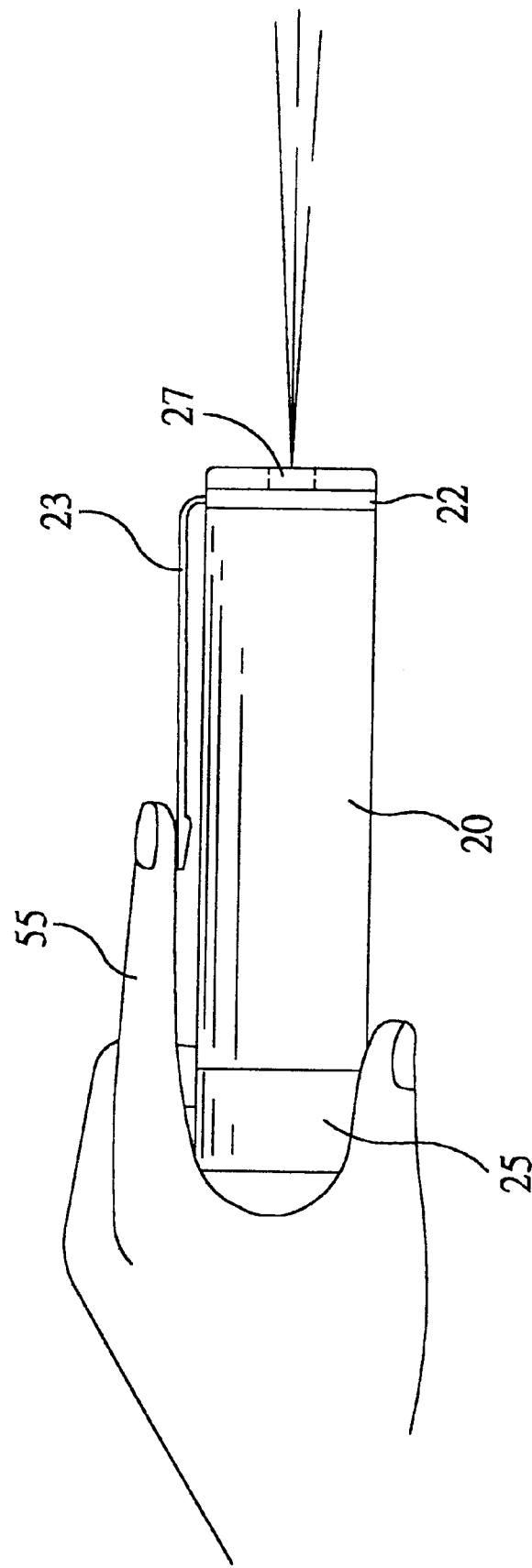
FIG. 4 is an applied view of the present invention, showing the laser generating loop closed, a laser beam emitted through the laser firing cap.

Referring to FIG. 4 and FIG. 3 again, normally, the electronic switch 335 is at an open circuit status, the laser generating circuit is off. When the user holds the rear end cap 25 or the barrel 20 in hand and touches the clip 23 with one finger 55, the laser generating loop is closed (the battery cells 40, the spiral metal spring 35, the circuit board 33, the laser diode 31, the barrel 20, the rear end cap 25 form a laser generating loop), i.e., the electronic switch 335 is turned from the open circuit status to a close circuit status, thereby causing the laser diode 31 of the laser generating unit 30 to emit a laser beam out of the annular laser firing cap 27. When the finger 55 is removed from the clip 23, the electronic switch 335 is off, and the laser diode 31 is off too.

The electrically insulated clip holder 22 is to hold the clip 23, and to isolate the clip 23 from the metal barrel 20. The electrically insulated clip holder 22 may be integrally molded with the clip 23. Further, the outside wall of the metal barrel 20 may be covered with a layer of electrically insulated paint to prevent a contact between the clip 23 and the metal body of the barrel 20 due to an error.

Figure 5:
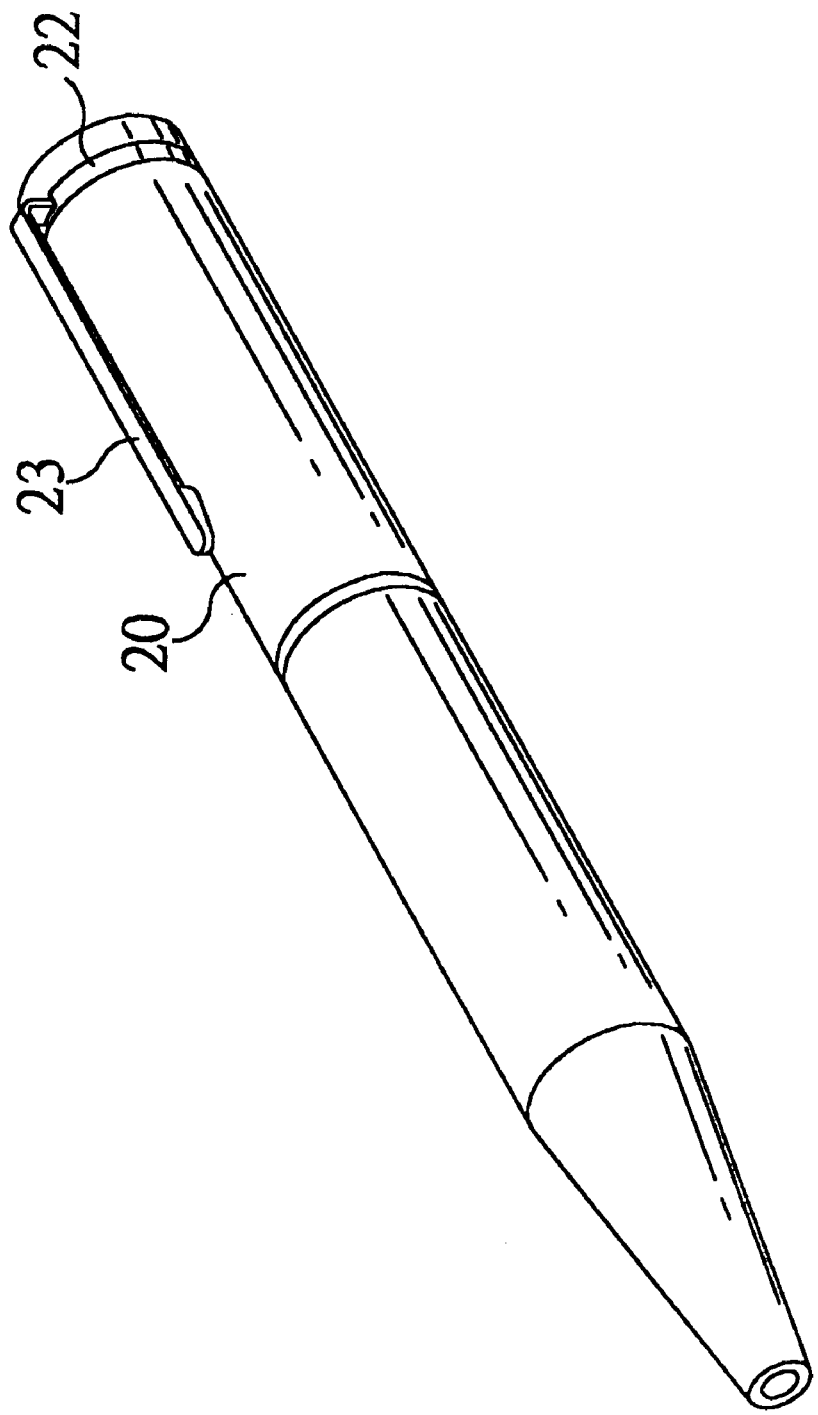
FIG. 5 shows the invention used in a pen.

FIG. 5 shows an application of the present invention, in which the laser pointer is fastened to the top end of a pen.

As indicated above, the laser pointer eliminates the installation of a mechanical switch, therefore no press button is installed in the metal barrel for operation, and the operation of the laser pointer can be achieved simply by touching the metal clip and the metal rear end cap with the hand.

Figure 6:
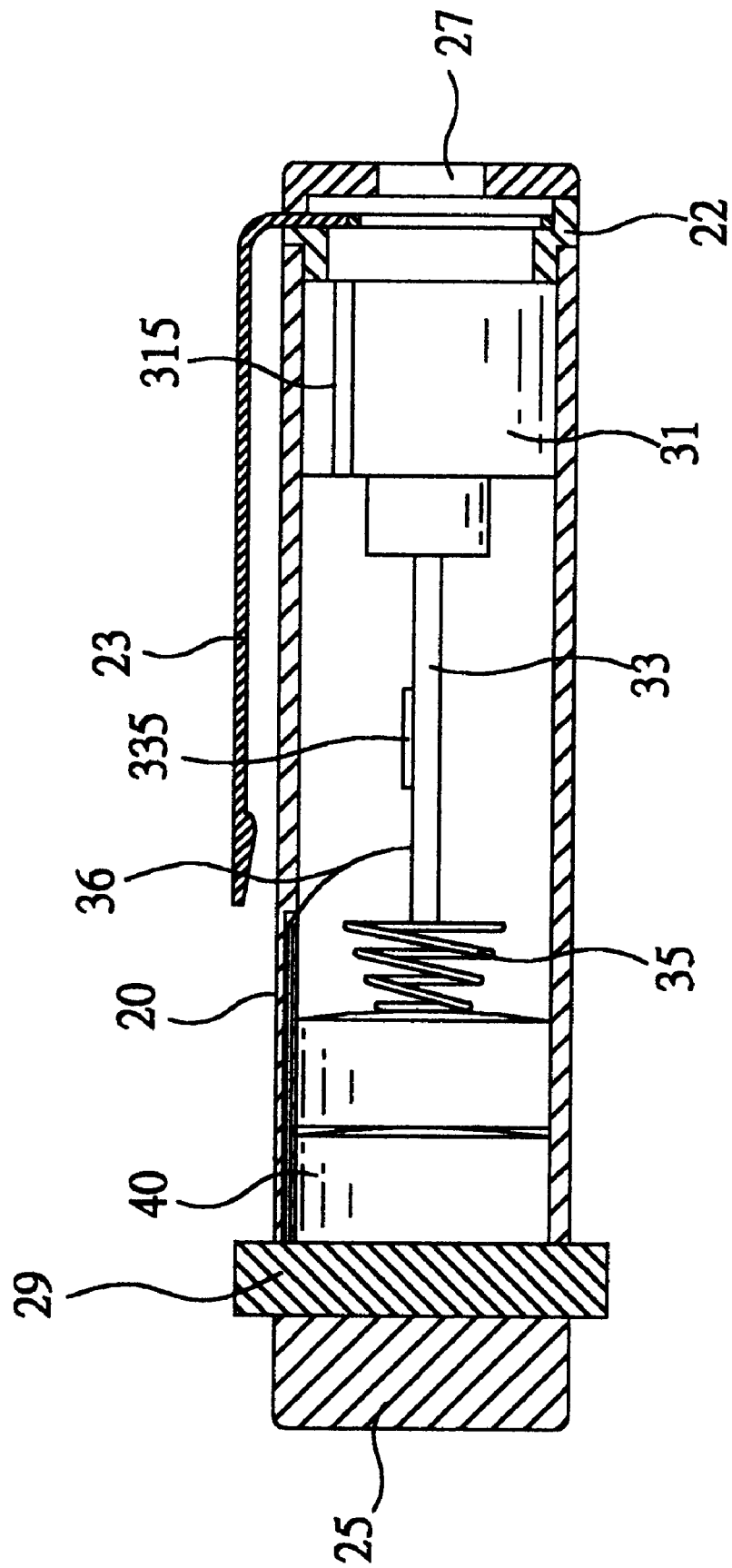
FIG. 6 is a sectional assembly view of the non-button laser pointer according to the second embodiment of the present invention.
Figure 7:
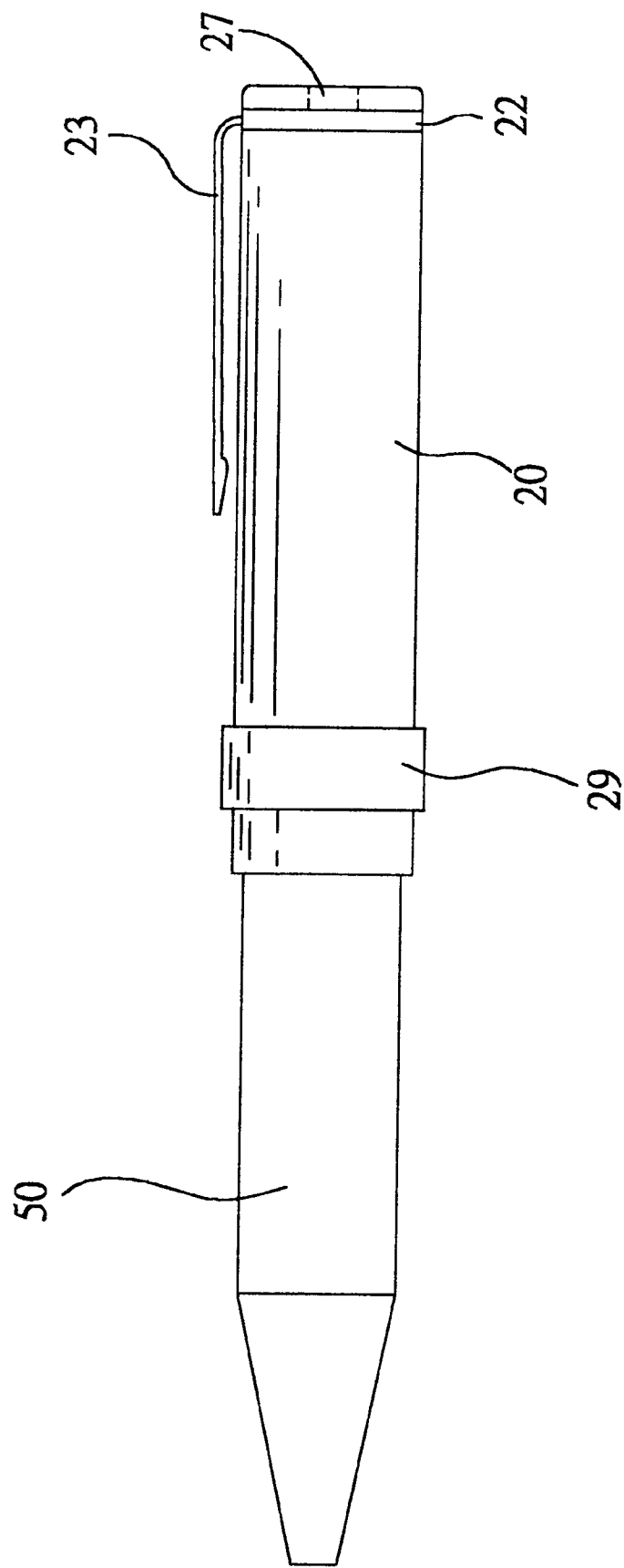
FIG. 7 shows the second embodiment of the present invention used in a pen.

Referring to FIG. 6 and FIG. 7, the ring 29 is mounted between the metal barrel 20 and the rear end cap 25. The signal line 36 is connected between the ring 29 and the circuit board 33. Therefor, the ring 29 is like the clip 23 as a on/off switch by touching the rear end cap 25 (or a pen 50)and the ring 29 in order to control the electronic switch 335 on the circuit board 33 at an open circuit status or not. Further, the metal barrel 20 has a wire groove on the inside wall of the shell thereof for receiving the signal line 36. The laser generating loop is closed (the battery cells 40, the spiral metal spring 35, the circuit board 33, the laser diode 31, the barrel 20 (or a pen 50), the ring 29 form a laser generating loop), i.e., the electronic switch 335 is turned from the open circuit status to a close circuit status. Further, the ring 29, the outside wall of the metal barrel 20, and the rear end cap 25 (or a pen 50) may be covered with a layer of electrically insulated paint to prevent a signal due to an error.

Although particular embodiments of the invention have been described and illustrated herein, it is recognized the modifications and variations may readily occur to those skilled in the art and, consequently, it is intended that the claims be interpreted to cover such modifications and equivalents.

What the invention claimed is:

1. A laser pointer comprising:
    a metal barrel having a front end, a rear end, and a laser firing hole at the front end thereof;
    a metal rear end cap fastened to the rear end of said metal barrel;
    an electrically insulated clip holder fastened to said metal barrel;
    a metal clip fastened to said electrically insulated clip holder outside said metal barrel and electrically separated from said metal barrel by said electrically insulated clip;
    a series of battery cells;
    a signal line;
    a laser generating unit mounted inside said metal barrel and controlled by an electronic switch thereon, said electronic switch having a first terminal connected to said metal clip by said signal line and a second terminal connected to said metal rear end cap through said series of battery cells; and
    wherein said electronic switch is switched on, causing said laser generating unit to emit a laser beam out of said laser firing hole when the user holds said metal rear end cap in hand and touching said metal clip with one finger; said electronic switch is switched off when the finger is removed from said metal clip.

2. The laser pointer of claim 1, wherein said electrically insulated clip holder is integrally molded with one end of said metal clip.

3. The laser pointer of claim 1, wherein said metal barrel is peripherally covered with a layer of electrically insulated covering.

4. The laser pointer of claim 1, wherein said laser generating unit comprises a circuit board on which said electronic switch is mounted, a laser diode controlled by said circuit board through said electronic switch to emit a laser beam, and a metal spiral spring connected between one terminal of said circuit board and one terminal of said series of battery cells opposite to said metal rear end cap.

5. The laser pointer of claim 4, wherein said laser diode having a wire groove on a shell thereof through which said signal line passes.

6. The laser pointer of claim 1, wherein said metal rear end cap is a pen.

7. A laser pointer comprising:
    a metal barrel having a front end, a rear end, and a laser firing hole at the front end thereof;
    a metal rear end cap fastened to the rear end of said metal barrel;
    an electrically insulated clip holder fastened to said metal barrel;
    a series of battery cells;
    a signal line;
    a laser generating unit mounted inside said metal barrel and controlled by an electronic switch thereon, said electronic switch having a first terminal connected to said metal clip by said signal line and a second terminal connected to said metal rear end cap through said series of battery cells;
    a ring; and
    wherein said electronic switch is switched on, causing said laser generating unit to emit a laser beam out of said laser firing hole when the user holds said metal rear end cap in hand and touching said ring with one finger; said electronic switch is switched off when the finger is removed from said ring.

8. The laser pointer of claim 7, wherein said electrically insulated clip holder is integrally molded with said ring.

9. The laser pointer of claim 7, wherein said metal rear end cap is a pen.

10. The laser pointer of claim 7, wherein the inside wall of said metal rear end cap having a wire groove on a shell thereof through which said signal line passes.

11. The laser pointer of claim 7, wherein a metal clip fastened to said electrically insulated clip holder outside said metal barrel and electrically separated from said metal barrel by said electrically insulated clip.

12. The laser pointer of claim 11, wherein a signal line is connected between said ring and said circuit board.

* * * * *